(12) United States Patent
Igel

(10) Patent No.: US 6,460,416 B1
(45) Date of Patent: Oct. 8, 2002

(54) CAPACITOR STRUCTURE AND FABRICATION PROCESS

(75) Inventor: Gunter Igel, Teningen (DE)

(73) Assignee: Micronas Intermetall GmbH, Freiburg (DE)

( * ) Notice: Subject to any disclaimer, the term of this patent is extended or adjusted under 35 U.S.C. 154(b) by 0 days.

(21) Appl. No.: 09/112,849

(22) Filed: Jul. 10, 1998

(30) Foreign Application Priority Data

Jul. 11, 1997 (DE) .......................................... 197 29 785

(51) Int. Cl.[7] .................................................. G01L 9/12
(52) U.S. Cl. ........................................................ 73/718
(58) Field of Search ................. 73/718, 724; 361/283.4, 361/756

(56) References Cited

U.S. PATENT DOCUMENTS

| | | | | |
|---|---|---|---|---|
| 5,050,034 A | * | 9/1991 | Hagner et al. ............... 361/283 |
| 5,186,054 A | * | 2/1993 | Sekimura ...................... 73/724 |
| 5,201,228 A | * | 4/1993 | Kojima et al. ................. 73/724 |
| 5,539,611 A | * | 7/1996 | Hegner et al. ............ 361/283.4 |
| 5,801,313 A | * | 9/1998 | Horibata et al. ............... 73/718 |
| 5,965,821 A | * | 10/1999 | Grudzien ...................... 73/724 |

FOREIGN PATENT DOCUMENTS

DE 3310643 3/1983

* cited by examiner

Primary Examiner—William Oen
(74) Attorney, Agent, or Firm—Duane Morris LLP

(57) ABSTRACT

The invention relates to a capacitor structure with two substrates (1) each having a capacitor electrode (3) deposited on its surface, the substrates (1) being joined together by bump structures located on both sides of the capacitor electrodes (3) such that the capacitor electrodes (3) lie opposite each other and form a capacitor, the distance d between the capacitor electrodes (3) being defined by the height of the bump structures, and measuring connections (5) being provided on one of the substrates (1) for making capacitance measurements.

13 Claims, 1 Drawing Sheet

CAPACITOR STRUCTURE AND FABRICATION PROCESS

FIELD OF INVENTION

This invention relates to a capacitor structure and to a process for fabricating a capacitor structure.

BACKGROUND OF INVENTION

DE 33 10 643 discloses a capacitor structure consisting of two substrates each having a capacitor electrode deposited thereon which is isolated from the respective substrate by an insulating layer. The distance between the capacitor electrodes is determined by a capping layer which is partly deposited on the capacitor electrodes and forms a dielectric of the capacitor. The two substrates are connected with one another using a bump technology. The capacitor structure is used as a pressure sensor.

A disadvantage of this capacitor structure is that it requires a spacing layer, namely the capping layer, to set the distance between the capacitor electrodes and hold the arrangement at this distance. The capacitance of the capacitor structure is determined by the thickness of the spacing layer, so that after deposition of the capping layer, variation of the capacitance is no longer possible. Furthermore, a variation of the thickness of the spacing layer causes a variation of the capacitance of the capacitor. In addition, the formation of the spacing layer requires additional photolithographic and etching steps which increase the complexity of the process. If a thick spacing layer is necessary, the process will be further complicated by the fact that the layer cannot be formed with standard thin-film processes.

The object of the invention is to provide a capacitor structure and a process for fabricating a capacitor structure whose capacitance is precisely adjustable over a wide range and which is easier to manufacture.

SUMMARY OF INVENTION

A capacitor structure including two substrates each having a capacitor electrode deposited on a surface, the substrates being joined together by bump structures located on both sides of the capacitor electrodes such that the capacitor electrodes lie opposite each other and form a capacitor, the distance d between the capacitor electrodes being defined by the height of the bump structures, and measuring connections being provided on one of the substrates for making capacitance measurements.

BRIEF DESCRIPTION OF THE FIGS.

Figure 1:
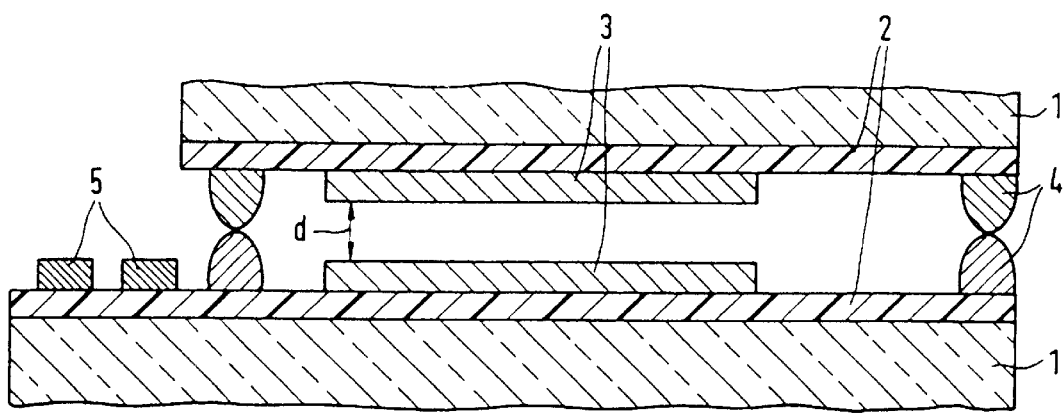
Figure 2:
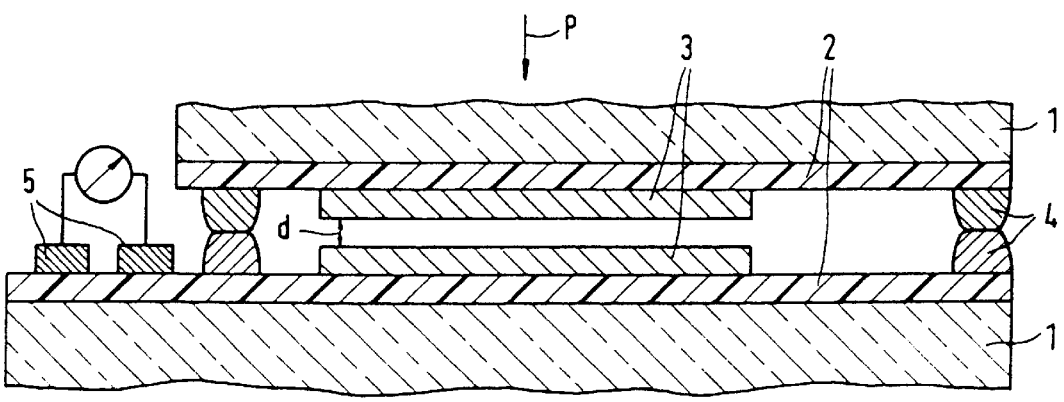

FIGS. 1 and 2 show a capacitor structure according to the invention during the joining process.

DETAILED DESCRIPTION OF THE INVENTION

This object is attained by a capacitor structure with two substrates each having a capacitor electrode deposited on its surface, the substrates being joined together by bump structures located on both sides of the capacitor electrodes such that the capacitor electrodes lie opposite each other and form a capacitor, the distance between the capacitor electrodes being defined by the height of the bump structures, and measuring connections being provided on one of the substrates for making capacitance measurements. Since the distance between the capacitor electrodes in the capacitor structure according to the invention is defined by the bump structures, no spacing layer is necessary between the capacitor electrodes. Thus, on the one hand, process steps for fabricating the spacing layer are saved and, on the other hand, the capacitance of the capacitor is not affected by such a spacing layer. The capacitance of the capacitor structure can be set at a fixed value $C_0$ within a wide range via the distance between the electrodes, since the bump structures are variable in height.

The invention further provides a process for fabricating a capacitor structure wherein two substrates each having a capacitor electrode deposited on its surface and at least one of which has bump structures on both sides of the capacitor electrode are joined by means of the bump structures in such a manner that the capacitor electrodes lie opposite each other and form a capacitor, wherein during the joining process, a pressure p is applied to one of the substrates to adjust the distance d between the capacitor electrodes, and the capacitance of the capacitor is measured, and wherein the joining process is terminated when a given capacitance value $C_0$ is reached.

Since pressure is applied to one of the substrates during the joining process, the distance between the capacitor electrodes, and thus the capacitance of the capacitor, can be adjusted during the joining process. No spacer is necessary for this. In addition, the capacitance of the capacitor can be varied over a wide range. A desired, predetermined capacitance value $C_0$ can be reliably and precisely set, since it is measured during the joining process. When the capacitance value $C_0$ has been reached, the joining process is terminated. No further pressure is applied to the substrate, so that the distance between the capacitor electrodes and, thus, the predetermined capacitance value $C_0$ remain fixed. The bump structures keep the shape they have after termination of the application of pressure to the substrate. The shape of the bump structures, particularly their height between the substrates, determines the distance between the substrates and, hence, the distance between the capacitor electrodes, and thus the capacitance of the capacitor.

A bump structure may consist of two bumps which were formed on the facing surfaces of the substrates and soldered together. In a preferred embodiment, the bump structures are made of metal, and during the joining process, the temperature in the areas of the bump structures is brought to a value $T_1$ suitable for joining the bumps to the respective opposite bumps or the opposite substrate, and the temperature at which the pressure p is applied is lowered to a value $T_0 < T_1$, and when the capacitance value $C_0$ is reached, the temperature is lowered to the ambient temperature. This embodiment takes advantage of the fact that the metal bumps unite at the temperature $T_1$, thereby centering themselves, and that at the temperature $T_0$, the bump structure is deformable by application of pressure, so that the height of the bump structures decreases. Thus, by applying pressure to one of the substrates, the distance between the capacitor electrodes is continuously reduced.

Advantageously, the temperature $T_0$ is chosen to be lower than the melting point of the bump structure, with the bump structure still being plastically deformable. This makes the reduction of the distance between the substrates particularly simple. By being fused together, two bumps lying opposite each other are centered so that they abut on each other at their respective central points and can be easily compressed in this position.

When cooling down to the ambient temperature, the bump structures solidify in this centered form, i.e., with the fixed distance between the substrates. The range in which metallic bump structures are plastically deformable lies below the melting point or the eutectic temperature of the respective materials.

In one embodiment of the invention, the pressure is applied to the substrate in the areas above the bump structures. Then, the adjustment of the distance is continuous and reliable. The capacitance can be measured continuously as a function of the applied pressure, and the application of pressure can be stopped when the capacitance value $C_0$ is reached.

In another embodiment of the invention, the pressure is applied to the substrate in a central area of the latter. This may be very simple for practical handling. It should be taken into account that as a result of the application of pressure, the substrates may become bent, so that after the application of pressure has been stopped, the measured capacitance value will change. The accuracy with which the capacitance can be adjusted can be improved by applying the pressure to the substrate in steps for given periods of time, and making the capacitance measurements between these periods when no pressure is applied to the substrate.

The adjustment of the pressure during the joining process has an added advantage in that the function of the capacitance of the capacitor structure is determined in dependence upon the pressure. The diaphragm properties of the structure, which are influenced by the thickness or thickness variation of the latter, enter into this function. Thus, if the structure is used as a pressure sensor or a capacitance/pressure transducer, very reliable measurements are possible.

In a further embodiment of the invention, the substrates are made of glass. In still another embodiment, the substrates are made of a semiconductor material, particularly of silicon. In the latter case, an insulating layer is advantageously provided between the substrate and the capacitor electrode, so that the capacitor electrode is electrically isolated from the substrate. In both cases, the capacitor structure can be easily manufactured in large numbers.

In a further embodiment of the invention, the substrate is designed as a diaphragm, so that the capacitor structure forms a pressure sensor.

The invention will now be described in more detail with reference to the accompanying drawings.

FIG. 1 shows two substrates 1 which face each other. Each of the substrates 1 is provided with an insulating layer 2 which electrically isolates a respective capacitor electrode 3 from the respective substrate 1. On each of the substrates 1, bumps 4 were formed on both sides of the respective capacitor electrode 3. The two substrates 1 face each other so that the bumps 4 abut on one another and can thus be joined to form a bump structure, with the capacitor electrodes 3 geometrically defining a capacitor. The lower substrate 1 has measuring connections 5, between which the capacitance of the capacitor defined by the capacitor electrodes 3 can be measured.

FIG. 2 shows the arrangement of FIG. 1 at a later time during the joining process. The upper substrate 1 is subjected to a pressure p by which the bump structures are compressed, so that the distance d between the capacitor electrodes is reduced. At the same time, a capacitance measurement is made at the measuring connections 5 to determine the capacitance of the capacitor formed by the capacitor electrodes 3. When a predetermined capacitance value $C_0$ is reached, the reduction of the distance d between the capacitor electrodes 3 is stopped, i.e., no further pressure p is applied to the upper substrate 1.

In the structure according to the invention, the substrates 1 may be glass or semiconductor substrates. If the semiconductor material is silicon, an insulating layer of silicon oxide or silicon nitride can be used. The capacitor electrodes are typically metal, particularly gold or aluminum, and the bump structures are typically made of molybdenum, nickel, gold, lead, tin, or combinations thereof. The bump structures may be composed of layers of different materials with different melting points. Then, the bump structures can be selectively compressed only in the upper layer, for example. The capacitor structure can be used as a pressure sensor. The properties of the pressure sensor are determined particularly by the thickness of the substrate 1 which acts as a diaphragm.

In the following, the process according to the invention will be described. The substrates 1 are arranged to face each other as shown in FIG. 1, so that the bumps 4 abut on one another and the capacitor electrodes 3 lie opposite each other to form a capacitor. In the areas of the bumps 4, the capacitor structure is brought to a temperature $T_1$ necessary for the joining process. If the bumps 4 are made of metal, they can be soldered together. For the soldering temperature, the temperature $T_1$ is chosen to lie above the melting point of the metal, so that the bumps 4 will be fused together. The temperature is then reduced to a value $T_0$ below the melting point at which the bump structures are plastically deformable. Then, as shown in FIG. 2, a pressure p is applied to the upper substrate 1. By this pressure, the bump structures are compressed and the distance d between the capacitor electrodes is reduced. If the pressure p is applied to the central area of the upper substrate 1 as in the example of FIG. 2, it must be taken into account that the upper substrate 1 may deform under the pressure. As a result, the capacitance of the capacitor formed by the capacitor electrodes 3 will change after the application of the pressure p is stopped. In that case, the pressure p will be applied to the upper substrate 1 in steps, i.e., for given periods of time. The capacitance is measured continuously throughout the joining process, including the plastic deformation. The pressure may also be temporarily removed to determine the capacitance value $C_0$.

Although the invention has been described in preferred and alternative forms with a certain degree of particularity, it is understood that the present disclosure of the preferred and alternative forms has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I Claim:

1. A capacitor structure comprising two substrates (1) each having a capacitor electrode (3) deposited on a surface, the substrates (1) being joined together by bump structures located on both sides of the capacitor electrodes (3) such that the capacitor electrodes (3) lie opposite each other separated by a distance d and form a capacitor, the distance d between the capacitor electrodes (3) being defined by the structures, and measuring connections (5) being provided on one of the substrates (1) for making capacitance measurements, each of the bump structures including two tapered bumps (4) formed on the substrates, which have been compressed to provide the distance d.

2. The capacitor structure of claim 1, wherein the two bumps (4) of each of the bump structures are soldered together.

3. The capacitor structure of claim 1, wherein the substrates (1) are made of glass.

4. The capacitor structure of claim 1, wherein the substrates (1) are made of a semiconductor material, particularly of silicon.

5. The capacitor structure of claim 1, wherein one of the substrates (1) is designed as a diaphragm, so that the capacitor structure forms a pressure sensor.

6. A capacitor device comprising:

first and second capacitor electrodes; and, deformable bump structures formed adjacent to said capacitor electrodes for spacing said first and second capacitor electrodes apart a given distance, each of the bump structures including two tapered bumps (4), which have been compressed to provide the given distance;

wherein said given distance is a function of a desired capacitance of said device.

7. The device of claim 6, further comprising means for enabling measurement of said capacitance of said device when said bump structures are deformed such that the distance between said first and second capacitor electrodes approaches said given distance.

8. The device of claim 6, wherein said distance between said first and second capacitor electrodes is varied to approach said given distance, and further comprising means for enabling measurement of said capacitance of said device between said variances of the distance between said first and second capacitor electrodes.

9. The device of claim 6, wherein said bump structures are aligned such that when engaged said first and second capacitor electrodes are aligned.

10. The device of claim 9 wherein said bump structures are engageable to define said given distance.

11. The device of claim 10, wherein said bump structures are deformable and engageable when heated.

12. The device of claim 10, wherein said bump structures are pressure deformable and engageable.

13. The device of claim 6, wherein said first and second substrates are selected from the group consisting of glass and semiconductor materials.

* * * * *